3,355,498
BIS-PERFLUOROALKANE-SULFONES
Ivan Pascal, Wilmington, Del., and Richard Bernard Ward, Kennett Square, Pa., assignors to E. I. du Pont de Nemours and Company, Wilmington, Del., a corporation of Delaware
No Drawing. Filed Jan. 19, 1965, Ser. No. 426,659
6 Claims. (Cl. 260—607)

ABSTRACT OF THE DISCLOSURE

Bis-sulfones of the formula $RSO_2(CF_2CF_2)_nSO_2R$ prepared by oxidation of the corresponding disulfide. The bis-sulfones are useful in preparing $H(CF_2CF_2)H$ compounds by treating them with alkali.

---

This invention is directed to bis-sulfone products having the structure $RSO_2(CF_2CF_2)_nSO_2R$ and to a novel process for their preparation.

More specifically, the present invention is directed to compounds having the structure $RSO_2(CF_2CF_2)_nSO_2R$, wherein R is an alkyl or cycloalkyl of one to ten carbon atoms and $n$ is a positive integer of from one to twenty.

The present invention is also directed to a novel process for preparing said bisulfones which comprises contacting an organic sulfide having the structure $RS(CF_2CF_2)_nSR$, wherein R and $n$ are the same as above, with an oxidizing agent capable of oxidizing the organic sulfide to an organic sulfone.

In both the product bis-sulfone compounds $$RSO_2(CF_2CF_2)_nSO_2R$$

of the present invention and the bis-sulfide starting materials, the R groups may broadly be any aliphatic organic group which is free of nonaromatic unsaturation, oxidizable substituents, or substituents which react with tetrafluoroethylene or free radical conditions. These requirements result from the method of preparation of both materials. In view of these requirements, therefore, the R groups of the present invention may be either alkyl of one to ten carbons or cycloalkyl of four to ten carbons. The number of tetrafluoroethylene groups, represented by the value $n$, may be from one to about twenty.

The preferred bis-sulfones $RSO_2(CF_2CF_2)_nSO_2R$ of the present invention are those where R is alkyl of one to five carbon atoms and $n$ is an integer of from one to about ten. These products are the more readily available, being prepared from more readily available starting materials.

The oxidation process of the present invention is accomplished by using any oxidizing agents capable of converting the organic bis-sulfides $RS(CF_2CF_2)_nSR$ to the organic bis-sulfones. The oxidation must be carried out under neutral or acidic conditions, i.e., a pH of from 0 to 7. Examples of oxidizing agents utilized in the present invention are perbenzoic acid, concentrated nitric acid, fuming nitric acid, chromium trioxide in either acetic acid, aqueous nitric acid or sulfuric acid, alkali permanganates such as potassium permanganate in weakly acidic aqueous solution, acetic acid or acetone, and hydrogen peroxide, such as a 30% aqueous hydrogen peroxide solution dissolved in acetic acid or acetic acid-acetic acid anhydride mixtures. Since permanganates form alkali during oxidation, sufficient acid should be provided to neutralize such alkali. It has been found that alkaline permanganate will not convert the bis-sulfides to bis-sulfones. Strong acid-permanganate solutions must, of course, be avoided due to the explosive nature of permanganates in contact with strong acids.

The temperature at which the oxidation of the bis-sulfides is carried out is not critical. However, since higher temperatures accelerate the oxidation, it is preferred to carry out the oxidation of this bis-sulfides $$RS(CF_2CF_2)_nSR$$

by heating. Temperatures of from 50° C. to about 110° C. are preferred.

Stable reaction media, such as water or acetic acid, are quite useful, but not necessary. The reaction media need not be a solvent for either the reactants or the products. Reaction times are not critical since product forms upon contacting the reactants. Reaction times for completion of the reaction may vary from as little as one hour to as high as twenty-four hours depending on the starting bis sulfide, the oxidizing agent and the particular reaction media if one is used.

The product bis-sulfones $RSO_2(CF_2CF_2)_nSO_2R$ are solids which are readily recovered by filtration of the reaction mixtures. If solvents such as acetic acid are used as the reaction media, drowning of the reaction mass in water to precipitate the bis-sulfone product may be required. The desired bis-sulfones products can be further purified, if desired, by recrystallization of the bis-sulfones from solvents such as methanol or ethanol.

The bis-sulfones $RSO_2(CF_2CF_2)_nSO_2R$ of this invention are primarily useful as intermediates. Treating any of the defined bis-sulfones products with aqueous alkali results in formation of the $\alpha,\omega$-dihydroperfluoroalkanes of the structure $H(CF_2CF_2)_nH$. The $\alpha,\omega$-dihydroperfluoroalkanes prepared from the bis-sulfones of the present invention range from a gas where $n$ has a low value to high-boiling liquids or solids where $n$ has a high value. The $\alpha,\omega$-dihydroperfluoroalkanes $H(CF_2CF_2)_nH$ ($n > 1$) are useful dielectrics or insulating media and as stable fluids. The compound $H(CF_2CF_2)H$ is a useful refrigerant (see U.S.P. 3,185,065).

The bis-sulfides $RS(CF_2CF_2)_nSR$ are prepared by reaction of organic disulfides RS—SR with tetrafluoroethylene, following the procedure described in U.S.P. 2,443,-003. According to the procedure described in U.S.P. 2,443,003, R in the disulfide RS—SR may be any aliphatic organic group free of nonaromatic unsaturation or any substituents or groups which react adversely with tetrafluoroethylene or the free radical conditions present. Therefore, as stated hereinbefore, for the purposes of this invention, R must also be free of substituents or groups which are readily oxidized. Accordingly, the R group may be alkyl or cycloalkyl previously described. Since disulfides RS—SR are most readily available when R is an alkyl group of one to five carbons, products containing such alkyl groups are most easily prepared. The process described in U.S.P. 2,443,003 leads to products $RS(CF_2CF_2)_nSR$ where $n$ has a wide range of values, including from one to twenty. Those wherein $n$ is from one to ten predominate. Thus, the bis-sulfides $RS(CF_2CR_2)_nSR$, wherein R is an alkyl group of one to five carbons and $n$ is from one to ten, being the most readily available starting materials, react in the novel process of this invention to form the most preferred bis-sulfone products.

Representative examples illustrating the present invention are as follows. All parts are by weight unless otherwise specified.

Example 1

A solution of 450 parts 30% hydrogen peroxide in 300 parts glacial acetic acid was added to 194 parts of 1,2-bis(methylthio)tetrafluoroethane ($CH_3SCF_2CF_2SCH_3$) and heated at 105° C. over a period of four hours. The resulting mixture was then cooled and poured into water. The product, 1,2-bis(methylsulfonyl)tetrafluoroethane [$CH_3SO_2(CF_2CF_2)SO_2CH_3$], precipitated and was isolated by filtration and recrystallized from ethanol. The product had a melting point of 125° C. A 95% yield of product was obtained.

*Analysis.*—Calcd. for $C_4H_6F_4O_4S_2$: C, 18.6; H, 2.3; F, 29.4; S, 24.8. Found: C, 18.6; H, 2.4; F, 29.5; S, 24.8.

Example 2

Following the procedure outlined in Example 1, 194 parts of 1,4-bis(methylthio)octafluorobutane $$[CH_3S(CF_2CF_2)_2SCH_3]$$

were treated with 450 parts 30% hydrogen peroxide in 300 parts glacial acetic acid. The product, 1,4-bis(methylsulfonyl)octafluorobutane $[CH_3SO_2(CF_2CF_2)_2SO_2CH_3]$, was isolated and purified as in Example 1. The product had a melting point of 152° C. A 95% yield of product was obtained.

*Analysis.*—Calcd. for $C_6H_6F_8O_4S_2$: C, 20.2; H, 1.8; F, 42.2; S, 17.9. Found: C, 20.1; H, 1.7; F, 42.4; S, 17.9.

When 1,4-bis(cyclohexylthio)octafluorobutane and 1,4-bis(cyclobutylthio)octafluorobutane are substituted for 1,4-bis(methylthio)octafluorobutane in the above procedure, similar yields of the corresponding bis-sulfone products were obtained.

Example 3

Following the procedure outlined in Example 1, 394 parts of 1,6-bis(methylthio)dodecafluorohexane $$[CH_3S(CF_2CF_2)_3SCH_3]$$

were treated with 450 parts 30% hydrogen peroxide in 300 parts glacial acetic acid. The product, 1,6-bis(methylsulfonyl)dodecafluorohexane $$[CH_3SO_2(CF_2CF_2)_3SO_2CH_3]$$

was isolated and purified as in Example 1. The product had a melting point of 170° C. A 90% yield of product was obtained.

*Analysis.*—Calcd. for $C_8H_6F_{12}O_4S_2$: C, 20.9; H, 1.3; F, 49.7; S, 14.0. Found: C, 21.1; H, 1.5; F, 49.8; S, 13.1.

Example 4

Following the procedure outlined in Example 1, 494 parts of 1,8-bis(methylthio)hexadecafluorooctane $$[CH_3S(CF_2CF_2)_4SCH_3]$$

were treated with 450 parts 30% hydrogen peroxide in 300 parts glacial acetic acid. The product, 1,8-bis(methylsulfonyl)hexadecafluorooctane $$[CH_3SO_2(CF_2CF_2)_4SO_2CH_3]$$

was isolated and purified as in Example 1. The product had a melting point of 172° C. A yield of 90% of product was obtained.

*Analysis.*—Calcd. for $C_{10}H_6F_{16}O_4S_2$: C, 21.5; H, 1.1; F, 54.4; S, 11.5. Found: C, 21.8; H, 1.1; F, 54.7; S, 11.4.

Example 5

Using the procedure of Example 1, 415 parts of 1,10-bis(methylthio)eicosafluorodecane $$[CH_3S(CF_2CF_2)_5SCH_3]$$

were treated with 315 parts 30% hydrogen peroxide in 210 parts acetic acid. The product, 1,10-bis(methylsulfonyl)eicosafluorodecane $[CH_3SO_2(CF_2CF_2)_5SO_2CH_3]$, was isolated and purified as in Example 1. The product had a melting point of 189° C. A yield of 85% of product was obtained.

*Analysis.*—Calcd. for $C_{12}H_6F_{20}O_4S_2$: C, 21.9; H, 0.9; F, 57.7; S, 9.7; Found: C, 22.7; H, 1.1; F, 59.9; S, 9.6.

Example 6

Eighty parts of 1,10-bis(methylsulfonyl)eicosafluorodecane were heated for about two hours under reflux with a solution of 200 parts water and 100 parts sodium hydroxide until the initially solid starting material was converted to an oil. The oil was collected, washed with dilute hydrochloric acid, then water, dried over silica gel and distilled, giving a 94% yield of 1,10-dihydroeicosafluorodecane having a boiling point of 153–154° C., at atmospheric pressure, 95–97° C./100 mm., and a melting point of 42–43° C.

Using similar procedures, 1,8-dihydrohexadecafluorooctane, B.P. 120° C., 1,6-dihydrododecafluorohexane, B.P. 85° C., 1,4-dihydrooctafluorobutane, B.P. 39° C., and 1,2-dihydrotetrafluoroethane, B.P. —19° C., were prepared from the corresponding bis-sulfones. In the case of the latter two products which are quite volatile, the products were distilled from the reaction mixture as formed and condensed using refrigerated condensers.

The compounds $H(CF_2CF_2)_nH$ have a number of uses. For example, the products $H(CF_2CF_2)_nH$, $n>1$, are stable liquids and useful dielectric fluids as shown by the following representative data. The data was obtained by testing the designated liquids in dielectric test cells using standard procedures.

TABLE
[Dielectric values at 25° C.]

| Compound | Frequency, c.p.s. | Dielectric Constant, $\epsilon'$ | Dissipation Factor, tan. $\delta$ | Resistivity, ohm-cm. |
|---|---|---|---|---|
| $H(CF_2CF_2)_2H$ | $1\times10^5$ | 8.17 | <0.00003 | $7.2\times10^8$ |
| $H(CF_2CF_2)_3H$ | $1\times10^5$ | 5.97 | <0.00003 | $1.8\times10^{10}$ |
| $H(CF_2CF_2)_4H$ | $1\times10^5$ | 4.87 | <0.00003 | $3.5\times10^9$ |

Example 7

A mixture of 400 parts 1,4-bis(methylthio)octafluorobutane and excess strong nitric acid (concentrated or fuming) was heated for twelve hours at reflux. The mixture was cooled and poured into water. The precipitated 1,4-bis(methylsulfonyl)octafluorobutane was collected and recrystallized from ethanol. A 93% yield of the product was obtained.

Example 8

A mixture of one part 1,4-bis(methylthio)octafluorobutane, two parts chromium trioxide and 25 parts concentrated sulfuric acid was heated at 50° C. for one hour. The mixture was cooled and poured into water. The precipitated 1,4-bis(methylsulfonyl)octafluorobutane was purified by recrystallization from ethanol. A 96% yield of product was obtained.

Example 9

Following the procedure outlined in Example 1, 22 parts 1,2-bis(ethylthio)tetrafluoroethane $$(C_2H_5SCF_2CF_2SC_2H_5)$$

were treated with 40 parts 30% hydrogen peroxide in 50 parts acetic acid. The product, 1,2-bis(ethylsulfonyl)-tetrafluoroethane $(C_2H_5SO_2CF_2CF_2SO_2C_2H_5)$, was isolated and purified as in Example 1. The product had a melting point of 46° C. A 92% yield of product was obtained.

*Analysis.*—Calcd. for $C_6H_{10}F_4O_4S_2$: C, 25.2; H, 3.6. Found: C, 25.2; H, 3.5.

Since it is obvious that many changes and modifications can be made in the above-described details without departing from the nature and spirit of the invention, it is to be understood that the invention is not to be limited to said details.

The embodiments of the invention in which an exclusive property or privilege is claimed are defined as follows:

1. Compounds having the structure $$RSO_2(CF_2CF_2)_nSO_2R$$

wherein R is an organic radical selected from the group consisting of $C_1$ to $C_{10}$ alkyl and $C_4$ to $C_{10}$ cycloalkyl and $n$ is a positive integer of from one to twenty.

2. Compounds having the structure $$RSO_2(CF_2CF_2)_nSO_2R$$

wherein R is an alkyl radical of one to five carbon atoms and $n$ is a positive integer of from one to ten.

3. The compound having the structure $$CH_3SO_2(CF_2CF_2)_2SO_2CH_3$$

4. The compound having the structure $$CH_3SO_2(CF_2CF_2)_3SO_2CH_3$$

5. The compound having the structure $$CH_3SO_2(CF_2CF_2)_4SO_2CH_3$$

6. The compound having the structure $$CH_3SO_2(CF_2CF_2)_5SO_2CH_3$$

References Cited

Houben-Weyl, "Methoden der Organischen Chemie," vol. 9, pp. 227–231 (1955).

CHARLES B. PARKER, *Primary Examiner.*

D. R. PHILLIPS, *Assistant Examiner.*